(12) United States Patent
Choo et al.

(10) Patent No.: US 11,924,262 B2
(45) Date of Patent: Mar. 5, 2024

(54) SERVER AND METHOD FOR PROVIDING STREAMING EVENT EFFECT ADJUSTMENT FUNCTION

(71) Applicant: TOOTHLIFE CO., LTD., Seongnam (KR)

(72) Inventors: Yun Sung Choo, Gyeongju (KR); Won Pyo Hong, Seongnam (KR); Joo Won Kim, Anyang (KR)

(73) Assignee: TOOTHLIFE CO., LTD. (KR)

( * ) Notice: Subject to any disclaimer, the term of this patent is extended or adjusted under 35 U.S.C. 154(b) by 424 days.

(21) Appl. No.: 17/364,964

(22) Filed: Jul. 1, 2021

(65) Prior Publication Data
US 2022/0224741 A1      Jul. 14, 2022

(30) Foreign Application Priority Data

Jan. 12, 2021   (KR) .................. 10-2021-0004001

(51) Int. Cl.
*H04L 65/75*      (2022.01)
*G06Q 30/0201*    (2023.01)
*H04L 65/61*      (2022.01)
*G06Q 20/12*      (2012.01)
*G10L 13/02*      (2013.01)

(52) U.S. Cl.
CPC ......... *H04L 65/75* (2022.05); *G06Q 30/0201* (2013.01); *H04L 65/61* (2022.05); *G06Q 20/123* (2013.01); *G10L 13/02* (2013.01)

(58) Field of Classification Search
CPC ..... H04L 65/75; H04L 65/61; G06Q 30/0201; G06Q 20/123; G10L 13/02
See application file for complete search history.

(56) References Cited

U.S. PATENT DOCUMENTS

| | | | |
|---|---|---|---|
| 2013/0205322 A1* | 8/2013 | Sinha ................. | H04N 21/4784 725/19 |
| 2019/0220851 A1* | 7/2019 | Barnes .............. | G06Q 20/3224 |
| 2019/0297385 A1* | 9/2019 | Park ................. | H04N 21/25866 |
| 2019/0313146 A1* | 10/2019 | Kakuschke ........... | H04N 21/21 |
| 2019/0333117 A1* | 10/2019 | Lee ......................... | G06Q 20/10 |

FOREIGN PATENT DOCUMENTS

| | | |
|---|---|---|
| KR | 20120064852 A | 6/2012 |
| KR | 20160098927 A | 8/2016 |
| KR | 20180059322 A | 6/2018 |
| KR | 20180059323 A | 6/2018 |
| KR | 20200002608 A | 1/2020 |
| KR | 20200010022 A | 1/2020 |

OTHER PUBLICATIONS

Grant of Patent for Korean Patent Application No. 10-2021-0004011 dated Mar. 25, 2021 (2 pages).

* cited by examiner

*Primary Examiner* — Yassin Alata
(74) *Attorney, Agent, or Firm* — Harness, Dickey & Pierce, P.L.C.

(57) ABSTRACT

Provided is a sponsorship server including: a transceiver; at least one processor; and at least one memory operably connected to the at least one processor, and storing instructions for enabling the at least one processor to perform operations.

9 Claims, 3 Drawing Sheets

SERVER AND METHOD FOR PROVIDING STREAMING EVENT EFFECT ADJUSTMENT FUNCTION

CROSS REFERENCE TO RELATED APPLICATION

The present application claims priority to Korean Patent Application No. 10-2021-0004001, filed Jan. 12, 2021, the entire contents of which is incorporated herein for all purposes by this reference.

BACKGROUND OF THE INVENTION

Field of the Invention

The present disclosure relates to a server and a method for providing a streaming event effect adjustment function.

Description of the Related Art

Figure 1:
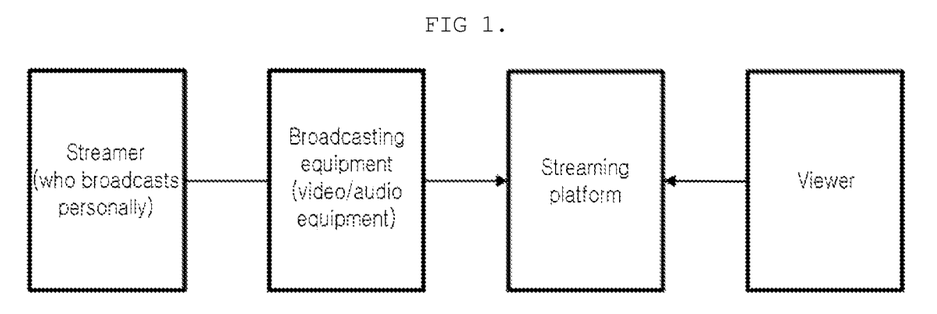
FIG. 1 is a diagram illustrating a streaming system in the related art.

In South Korea and other countries streamers who broadcast personally using streaming platforms, such as YouTube, Afreeca, Twitch, etc., and viewers have increased in number. As shown in FIG. 1, conventional streaming platforms provide a one-way service in which a person who broadcasts transmits his or her broadcast window in real time using an input device, such as a camera, a microphone, etc., and viewers receive and view the window in a one-way manner.

The viewers may sponsor the streamer by paying the sponsorship money for success of a mission that is set by the viewers and the streamer in the middle of streaming. When a viewer sponsors the streamer, an event window giving notice of sponsorship is also transmitted as the concept of a reward for sponsorship. However, a conventional streaming service only provides a function of simply overlaying the viewer's ID and the amount of sponsorship money on the window.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent Application Publication No. 10-2016-0098927; and
(Patent Document 2) Korean Patent Application Publication No. 10-2020-0002608.

SUMMARY OF THE INVENTION

The present disclosure is directed to providing a server and a method for providing a streaming event effect adjustment function.

It is to be understood that technical problems to be solved by various embodiments of the present disclosure are not limited to the aforementioned technical problems and other technical problems which are not mentioned will be considered by those skilled in the art from the following description of the various embodiments of the present disclosure.

According to one aspect of the present disclosure, there is provided a sponsorship server including: a transceiver; at least one processor; and at least one memory operably connected to the at least one processor, and storing instructions for enabling the at least one processor to perform operations, wherein the operations include: receiving a first transmission window in real time to provide streaming content from a streamer terminal through the transceiver; receiving sponsorship money data from multiple sponsor terminals through the transceiver, the sponsorship money data including a sponsor ID (identification) and an amount of sponsorship money set for each of the multiple sponsor terminals; and determining whether during a first preset time period from a point in time when the sponsorship money data is received, the sponsorship money data is further received from the multiple sponsor terminals through the transceiver, wherein when the sponsorship money data is not received from the multiple sponsor terminals for the first preset time period, the operations further include: generating an event split window after the first preset time period, generating a second transmission window by overlaying the event split window on the first transmission window, and transmitting the second transmission window to a streaming server (30) through the transceiver, wherein the event split window includes first event data that is generated by combining text data corresponding to the sponsor ID, text data corresponding to the amount of sponsorship money, and first preset effect data, and the first preset effect data is set on the basis of an event intensity value that is calculated on the basis of the amount of sponsorship money.

The sponsorship money data may further include sponsorship wording information, and the operations may further include: converting the sponsorship wording information into voice data after the first preset time period and generating second event data by combining the voice data and the first preset effect data, and transmitting the second event data with the second transmission window to the streaming server (30).

The first preset effect data may include at least one selected from a group of volume of the voice data and color, size, and highlighting effects of the text data corresponding to the sponsor ID and the text data corresponding to the amount of sponsorship money.

When the sponsorship money data is further received from the multiple sponsor terminals for the first preset time period, the operations may further include: further receiving the sponsorship money data from the multiple sponsor terminals through the transceiver for a second preset time period from a point in time when the first preset time period ends; determining, on the basis of the sponsorship money data, the sponsor terminal that has given the highest amount of sponsorship money among the multiple sponsor terminals, after the second preset time period; generating the event split window; generating the second transmission window by overlaying the event split window on the first transmission window; and transmitting the second transmission window to the streaming server (30) through the transceiver, wherein the event split window includes third event data that is generated by combining text data corresponding to the sponsor ID of the sponsor terminal that has given the highest amount of sponsorship money, text data corresponding to the highest amount of sponsorship money, and second preset effect data, and the second preset effect data is set on the basis of both the event intensity value and an additional event intensity value calculated on the basis of the amount of sponsorship money further received.

The sponsorship money data may further include sponsorship wording information, and the operations may further include: converting the sponsorship wording information into voice data after the second preset time period and generating fourth event data by combining the voice data and the second preset effect data, and transmitting the fourth event data with the second transmission window to the streaming server (30).

According to another aspect of the present disclosure, there is provided a method performed by a sponsorship server, the method including: receiving a first transmission window in real time to provide streaming content from a streamer terminal; receiving sponsorship money data from multiple sponsor terminals, the sponsorship money data including a sponsor ID (identification) and an amount of sponsorship money set for each of the multiple sponsor terminals; and determining whether during a first preset time period from a point in time when the sponsorship money data is received, the sponsorship money data is further received from the multiple sponsor terminals, wherein when the sponsorship money data is not received from the multiple sponsor terminals for the first preset time period, the method further includes: generating an event split window after the first preset time period; generating a second transmission window by overlaying the event split window on the first transmission window; and transmitting the second transmission window to a streaming server (30), wherein the event split window includes first event data that is generated by combining text data corresponding to the sponsor ID, text data corresponding to the amount of sponsorship money, and first preset effect data, and the first preset effect data is set on the basis of an event intensity value that is calculated on the basis of the amount of sponsorship money.

The sponsorship money data may further include sponsorship wording information, and the method may further include: converting the sponsorship wording information into voice data after the first preset time period and generating second event data by combining the voice data and the first preset effect data; and transmitting the second event data with the second transmission window to the streaming server (30).

The first preset effect data may include at least one selected from a group of volume of the voice data and color, size, and highlighting effects of the text data corresponding to the sponsor ID and the text data corresponding to the amount of sponsorship money.

The method may further include: when the sponsorship money data is further received from the multiple sponsor terminals for the first preset time period, further receiving the sponsorship money data from the multiple sponsor terminals for a second preset time period from a point in time when the first preset time period ends; determining, on the basis of the sponsorship money data, the sponsor terminal that has given the highest amount of sponsorship money among the multiple sponsor terminals, after the second preset time period; generating the event split window; generating the second transmission window by overlying the event split window on the first transmission window; and transmitting the second transmission window to the streaming server (30), wherein the event split window includes third event data that is generated by combining text data corresponding to the sponsor ID of the sponsor terminal that has given the highest amount of sponsorship money, text data corresponding to the highest amount of sponsorship money, and second preset effect data, and the second preset effect data is set on the basis of both the event intensity value and an additional event intensity value calculated on the basis of the amount of sponsorship money further received.

The technical solutions are merely some parts of the various embodiments of the present disclosure and the various embodiments into which the technical features of the present disclosure are incorporated can be derived and understood by those skilled in the art from the following detailed description of the present disclosure.

According to the various embodiments of the present disclosure, the server and the method for providing a streaming event effect adjustment function are provided.

Effects that may be acquired from the present disclosure will not be limited to the above described effects, and other effects which are not mentioned will become apparent to those skilled in the art from the following detailed description of the present disclosure.

BRIEF DESCRIPTION OF THE DRAWINGS

The accompanying drawings are provided to aid understanding various embodiments of the present disclosure, and provide the various embodiments of the present disclosure together with a detailed description. However, technical features of the various embodiments of the present disclosure are not limited to a particular drawing, and features disclosed in each drawing may be combined with each other to construct a new embodiment. Reference numerals in each drawing denote structural elements.

DETAILED DESCRIPTION OF THE INVENTION

Hereinafter, embodiments according to the present disclosure will be described in detail with reference to the accompanying drawings. With the accompanying drawings, a detailed description of the present disclosure, which will be given below, is to describe exemplary embodiments of the present disclosure, rather than to show the only embodiments that can be implemented by the present disclosure. The following detailed description includes specific details in order to provide a thorough understanding of the present disclosure. However, it will be apparent to those skilled in the art that the present disclosure may be implemented without such specific details.

In some instances, known structures and devices are omitted or are shown in block diagram form focusing on important functions of the structures and devices, so as not to obscure the concept of the present disclosure. In addition, the same reference numerals are used throughout the present disclosure to refer to the same elements.

A variety of modifications and forms may be made to the various embodiments according to the concept of the present disclosure, so the various embodiments are shown in the drawings and will be described in detail in the present disclosure. However, this is not to limit various embodiments according to the concept of the present disclosure to particular disclosed forms, and includes modifications, equivalents, or substitutes included in the idea and the technical scope of the present disclosure.

Terms "first", "second", etc. used herein can be used to describe various elements, but the elements are not to be construed as being limited to the terms. The terms are used only to discriminate between one element and another element. For example, without departing from the scope according to the concept of the present disclosure, a first element may be named a second element, and similarly, a second element may be named a first element.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present. Other expressions that explain the relationship between elements, such as "between", "directly between", or "directly adjacent to", should be construed in the same way.

The terms used in the present disclosure are merely used to describe particular various embodiments, and are not intended to limit the present disclosure. An expression used in the singular encompasses the expression of the plural, unless it has a clearly different meaning in the context. In the present disclosure, it is to be understood that terms such as "including", "having", etc. are intended to indicate the existence of the features, numbers, steps, actions, elements, parts, or combinations thereof described, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of the relevant art and will not be interpreted in an idealized or overly formal sense unless expressly so defined herein. Hereinafter, various embodiments of the present disclosure will be described in detail with reference to the accompanying drawings.

Figure 2:
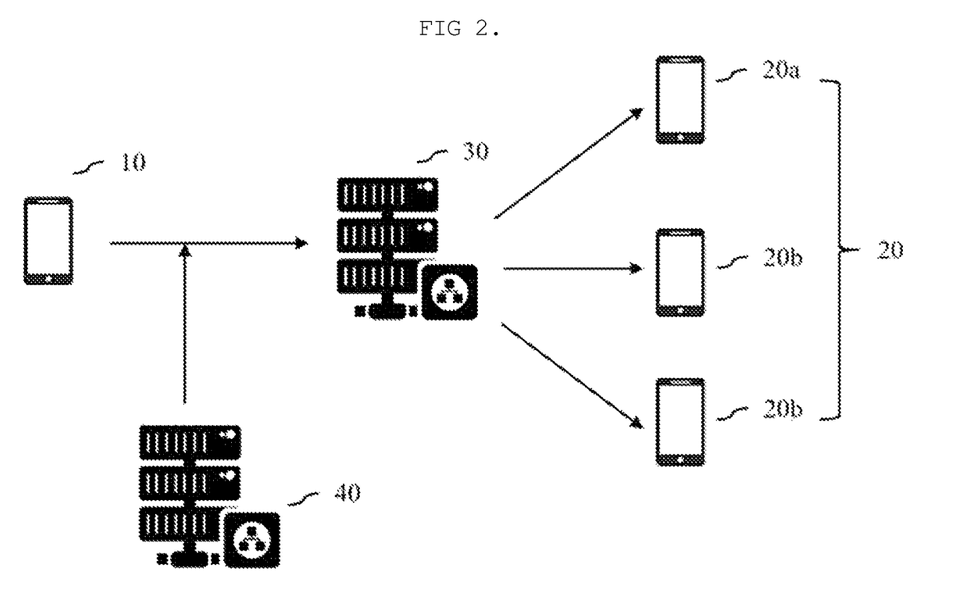
FIG. 2 is a diagram illustrating a streaming sponsorship system according to an embodiment of the present disclosure.
Figure 3:
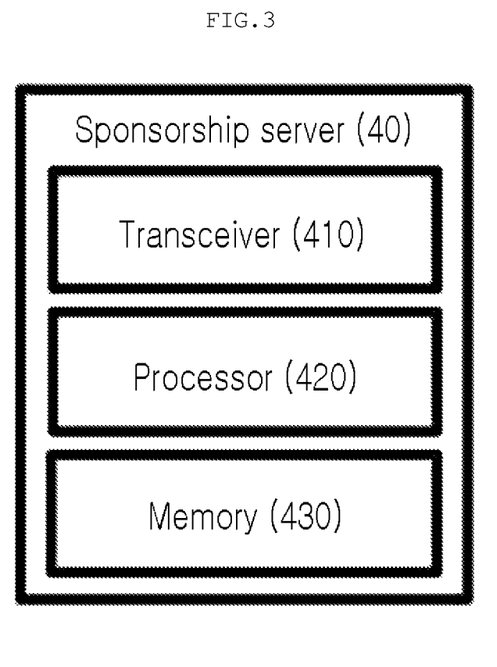
FIG. 3 is a block diagram illustrating a sponsorship server according to an embodiment of the present disclosure.

FIG. 2 is a diagram illustrating a streaming sponsorship system according to an embodiment of the present disclosure. FIG. 3 is a block diagram illustrating a sponsorship server according to an embodiment of the present disclosure.

Referring to FIG. 2, the streaming sponsorship system according to an embodiment of the present disclosure includes a streamer terminal 10, a sponsor terminal 20, a streaming server 30, and a sponsorship server 40.

The streamer terminal 10 provides streaming content to the sponsor terminal 20. For convenience of description, a case in which the streaming content is game content is described as an example in the present disclosure, but in addition to the game content, the streaming content in the present disclosure may be a broad concept including the following: movies, music, literature, pictures, cartoons, animations, letters, figures, colors, voices, movements, or paintings, or combinations thereof or all types of information and/or data related thereto, which may be provided through various media.

For example, the streamer terminal 10 may provide the sponsor terminal 20 with a transmission window of the streaming content, for example, a game, which is in the middle of play on the streamer terminal 10 in real time.

The sponsor terminal 20 receives the streaming content from the streamer terminal 10. For example, the sponsor terminal 20 may receive the transmission window of the game in the middle of play on the streamer terminal 10 in real time, from the streamer terminal 10. A plurality of the sponsor terminals 20 may be provided. In this case, the sponsor terminals 20 may receive the streaming content in the form of broadcasting.

In the present disclosure, examples of the terminal may include a smartphone, a mobile phone, a smart TV, a set-top box, a tablet PC, a digital camera, a camcorder, an E-book terminal, a digital broadcast terminal, a personal digital assistant (PDA), a portable multimedia player (PMP), a navigation device, a MP3 player, a wearable device, an air conditioner, a microwave oven, a stereo, a DVD player, etc. Herein, personal computers may include a laptop computer, a desktop computer, etc.

The streamer terminal 10 and the sponsor terminals 20 may receive the streaming content through the streaming server 30 and the sponsorship server 40.

The streaming server 30 receives various types of data (for example, data of the transmission window, etc.) related to the streaming content from the streamer terminal 10 and transmits various types of data related to the received streaming content to the sponsor terminals 20.

The streaming server 30 may provide the received streaming content as well as a service that the streaming server 30 itself provides, to the sponsor terminals 20. Alternatively, the streaming server 30 may receive, from the sponsorship server 40, data that is a combination of the various types of data related to the received streaming content and various types of data related to a mission, which is set by a sponsor and/or a streamer, and/or to the amount of sponsorship money given by a sponsor, and may provide the received data to the sponsor terminals 20.

In the present disclosure, the mission refers to a particular mission that a streamer promises to accomplish within the streaming content, and may be set by a sponsor and/or a streamer. For example, in the case in which the streaming content is game A, the mission may be various goals that the streamer can pursue in game A.

The sponsorship server 40 may cooperate with the streaming server 30 to provide a service that the streaming server 30 is unable to provide. In the present disclosure, the service that the streaming server 30 is unable to provide, in other words, a service provided only by the sponsorship server 40, may be a streaming event effect adjustment function.

Hereinafter, the sponsorship server 40 will be described in detail with reference to FIG. 3.

Referring to FIG. 3, the sponsorship server 40 includes a transceiver 410, a processor 420, and a memory 430.

The transceiver 410 may be connected to the processor 420, and may transmit and/or receive wireless signals. The transceiver 410 may include a transmitter and a receiver. The transceiver 410 may transmit or receive data to or from the streamer terminal 10, the sponsor terminals 20, and the streaming server 30.

The processor 420 controls the transceiver 410 or the memory 430 or both, and may be configured to realize the description, functions, procedures, suggestions, methods, and/or operation flowcharts of the present disclosure. For example, the processor 420 may receive wireless signals through the transceiver 410 and may store information contained in the wireless signals in the memory 430. In addition, the processor 420 may process information stored in the memory 430, generate wireless signals, and transmit the generated wireless signals through the transceiver 410.

The memory 430 may be connected to the processor 420, and may store various types of information related to the operation of the processor 420. For example, the memory 430 may store software code including instructions for performing a part or all of the processes controlled by the processor 420, or for performing the description, functions, procedures, suggestions, methods, and/or operation flowcharts of the present disclosure.

Hereinafter, various examples of operation of the processor 420 included in the sponsorship server 40 will be described.

1. Event Intensity Adjustment for a Case of No Additional Reception of Sponsorship Money Data According to an embodiment of the present disclosure, the processor may provide, on the basis of sponsorship money data received from the sponsor terminal, a transmission window in which an event split window is combined.

To this end, the processor may receive a first transmission window in real time to provide the streaming content from the streamer terminal through the transceiver.

The processor may receive sponsorship money data from multiple sponsor terminals through the transceiver. Herein, the sponsorship money data may include a sponsor ID (identification) and the amount of sponsorship money set for each of the multiple sponsor terminals.

When the sponsorship money data is received, the processor determines whether during a first preset time period from a point in time when the sponsorship money data is received, sponsorship money data is further received from the multiple sponsor terminals through the transceiver or not. That is, when the sponsorship money data is received, the processor does not generate the event split window immediately, but determines whether sponsorship money data is further received, while waiting for the first preset time period.

When sponsorship money data is not further received from the multiple sponsor terminals for the first preset time period, the processor generates the event split window only for the received sponsorship money data.

Specifically, the processor may generate the event split window after the first preset time period. Herein, the event split window may include first event data that is generated by combining the following: text data corresponding to a sponsor ID, text data corresponding to the amount of sponsorship money, and first preset effect data.

In the present disclosure, the first event data and third event data may be data that is a combination of text data and visual effects.

In addition, in the present disclosure, the first preset effect data and second preset effect data may be data set to provide the visual effects to text data. For example, the first preset effect data and the second preset effect data may include at least one of effects of the text data corresponding to the sponsor ID and of the text data corresponding to the amount of sponsorship money, wherein the effects are color, size, and highlighting effects.

Herein, the first preset effect data and the second preset effect data may be data set to provide volume effects to voice data, which will be described later. For example, the first preset effect data and the second preset effect data may further include the volume of the voice data.

The first preset effect data may be set on the basis of an event intensity value that is calculated on the basis of the amount of sponsorship money. The event intensity value may be multiplied by values associated with the first preset effect data. For example, a value acquired by multiplying the event intensity value and the saturation value or brightness value of the color of text data may be set as the first preset effect data. Accordingly, as the event intensity value increases, the value of the first preset effect data increases, and the event split window provided to the sponsor terminal may thus include event data in which more emphasized effects are combined.

The event intensity value may be a value proportional to the amount of sponsorship money. For example, the event intensity value may be a value acquired by dividing the amount of sponsorship money by 10000. Alternatively, the event intensity value may be a value the same as the amount of sponsorship money.

Afterward, the processor overlays the generated event split window on the first transmission window received in real time, generates a second transmission window, and transmits the second transmission window to the streaming server 30 through the transceiver.

The sponsorship money data may further include sponsorship wording information. The sponsorship wording information may be information on text (for example, a sponsorship message, etc.) that is separately input by the sponsor terminal.

In this case, the processor may convert the sponsorship wording information into voice data after the first preset time period. The processor may generate second event data by combining the first preset effect data with the voice data resulting from conversion.

For example, the second event data may refer to voice data in which the volume of the voice data resulting from conversion is adjusted using the first preset effect data. As described above, the first preset effect data may include the volume of voice data, and in this case, the volume of the voice data may be adjusted depending on the event intensity value. For example, the voice data having the volume that increases as the event intensity value increases may be generated as the second event data.

Afterward, the processor may transmit the second event data with the second transmission window to the streaming server 30.

2. Event Intensity Adjustment for a Case of Additional Reception of Sponsorship Money Data Unlike the above-described embodiments of the present disclosure, when sponsorship money data is further received from the multiple sponsor terminals for the first preset time period, the processor adjusts the event intensity, considering the additional receiving of the sponsorship money data.

The processor may further receive sponsorship money data from the multiple sponsor terminals through the transceiver for a second preset time period from a point in time when the first preset time period ends. In addition, in this case, unlike the above-described embodiments of the present disclosure, the processor may delay and/or drop the step of generating the second transmission window immediately after the first preset time period.

After a second time period, the processor may determine, on the basis of the sponsorship money data, the sponsor terminal that has given the highest amount of sponsorship money among the multiple sponsor terminals. For example, the processor may add up the amounts of sponsorship money included in all pieces of the sponsorship money data received, for each sponsor ID and may determine the sponsor terminal that gives the highest total amount of sponsorship money.

When determining the sponsor terminal that gives the highest total amount of sponsorship money, the processor generates an event split window, overlays the generated event split window on the first transmission window received in real time, and generates a second transmission window.

Herein, the event split window may include the third event data that is generated by combining the following: text data corresponding to the sponsor ID of the sponsor terminal that has given the highest amount of sponsorship money, text data corresponding to the highest amount of sponsorship money, and the second preset effect data. That is, this is means that when sponsorship money data is further received, an event split window is generated only for the sponsor terminal that has given the highest amount of sponsorship money. Therefore, according to the present disclosure, the sponsorship server may induce the sponsor terminals for sponsorship.

In addition, the second preset effect data may be set considering the event intensity value as well as an additional event intensity value that is calculated on the basis of the amount of sponsorship money further received. That is, when sponsorship money data is further received from the multiple sponsor terminals for the first preset time period, the second preset effect data is set considering both the event intensity value and the additional event intensity value.

The additional event intensity value may be a value proportional to the amount of sponsorship money, similarly to the event intensity value. For example, the additional event intensity value may be a value acquired by dividing the amount of sponsorship money received for the second preset time period by 10000. Alternatively, the additional event intensity value may be a value the same as the amount of sponsorship money.

Afterward, the processor may transmit the second transmission window to the streaming server 30 through the transceiver.

In the meantime, when the sponsorship money data further includes the sponsorship wording information, the processor converts the sponsorship wording information into voice data after the second preset time period, combines the second preset effect data and the voice data, and generates fourth event data.

For example, the fourth event data may refer to voice data in which the volume of the voice data resulting from conversion is adjusted using the second preset effect data.

Afterward, the processor may transmit the generated fourth event data with the second transmission window to the streaming server 30.

Figure 4:
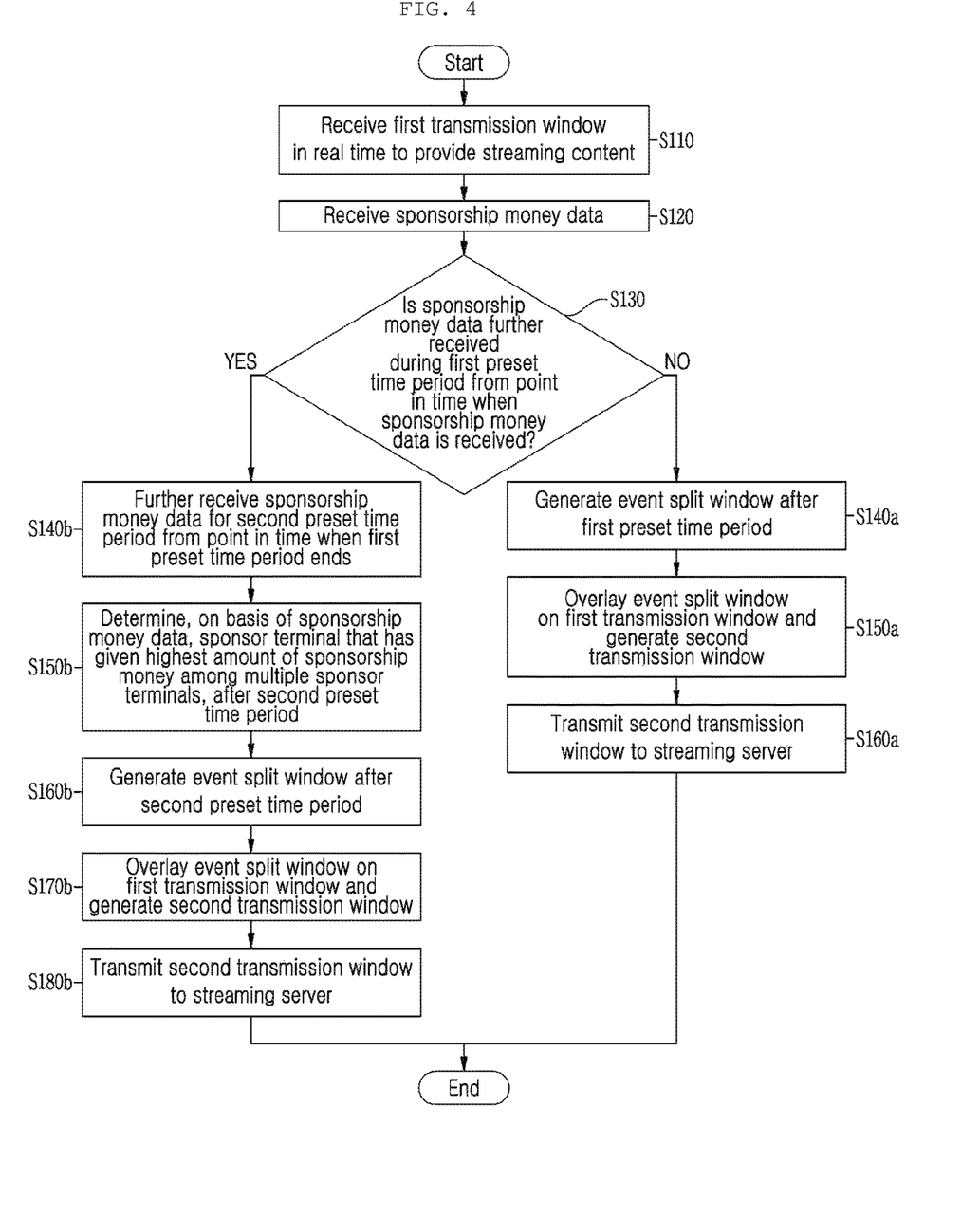
FIG. 4 is a flowchart illustrating a sponsorship method according to an embodiment of the present disclosure.

FIG. 4 is a flowchart illustrating a sponsorship method according to an embodiment of the present disclosure.

Hereinafter, the detailed description of the repeat parts will be omitted.

Referring to FIG. 4, at step S110, the sponsorship server receives a first transmission window in real time to provide the streaming content from the streamer terminal.

At step S120, the sponsorship server receives sponsorship money data from the multiple sponsor terminals. Herein, the sponsorship money data may include a sponsor ID (identification) and the amount of sponsorship money set for each of the multiple sponsor terminals.

At step S130, the sponsorship server may determine whether during the first preset time period from the point in time when the sponsorship money data is received, sponsorship money data is further received from the multiple sponsor terminals.

According to a result of determination at step S130, when sponsorship money data is not further received from the multiple sponsor terminals for the first preset time period, the sponsorship server generates an event split window after the first preset time period at step S140a.

Herein, the event split window may include the first event data that is generated by combining the following: text data corresponding to a sponsor ID, text data corresponding to the amount of sponsorship money, and the first preset effect data. The first preset effect data may be set on the basis of the event intensity value that is calculated on the basis of the amount of sponsorship money.

At step S150a, the sponsorship server overlays the event split window on the first transmission window and generates a second transmission window.

At step S160a, the sponsorship server transmits the second transmission window to the streaming server 30.

Alternatively, according to the result of determination at step S130, when sponsorship money data is further received from the multiple sponsor terminals for the first preset time period, the sponsorship server further receives sponsorship money data from the multiple sponsor terminals for the second preset time period from the point in time when the first preset time period ends at step S140b.

At step S150b, the sponsorship server determines, on the basis of the sponsorship money data, the sponsor terminal that has given the highest amount of sponsorship money among the multiple sponsor terminals, after the second preset time period.

At step S160b, the sponsorship server generates the event split window. Herein, the event split window may include the third event data that is generated by combining the following: text data corresponding to the sponsor ID of the sponsor terminal that has given the highest amount of sponsorship money, text data corresponding to the highest amount of sponsorship money, and the second preset effect data. The second preset effect data may be set on the basis of both the event intensity value and the additional event intensity value that is calculated on the basis of the amount of sponsorship money further received.

At step S170b, the sponsorship server overlays the event split window on the first transmission window and generates a second transmission window.

At step S180b, the sponsorship server transmits the second transmission window to the streaming server 30.

The embodiments of the present disclosure have been described to enable those skilled in the art to realize and implement the present disclosure. Although the present disclosure has been described with reference to the embodiments, those skilled in the art may make various modifications and changes to the embodiments of the present disclosure. Accordingly, the present disclosure should not be limited to the embodiments described herein, but should be accorded the broadest scope consistent with the principles and novel features disclosed herein.

What is claimed is:

1. A sponsorship server, comprising:
   a transceiver;
   at least one processor; and
   at least one memory operably connected to the at least one processor, and storing instructions for enabling the at least one processor to perform operations,
   wherein the operations comprise:
   receiving a first transmission window in real time to provide streaming content from a streamer terminal through the transceiver,
   receiving sponsorship money data from multiple sponsor terminals through the transceiver, the sponsorship money data including a sponsor ID (identification) and an amount of sponsorship money set for each of the multiple sponsor terminals, and
   determining whether during a first preset time period from a point in time when the sponsorship money data is received, the sponsorship money data is further received from the multiple sponsor terminals through the transceiver,
   wherein when the sponsorship money data is not received from the multiple sponsor terminals for the first preset time period, the operations further comprise:
generating an event split window after the first preset time period,
generating a second transmission window by overlaying the event split window on the first transmission window, and
transmitting the second transmission window to a streaming server through the transceiver,
wherein the event split window includes first event data that is generated by combining text data corresponding to the sponsor ID, text data corresponding to the amount of sponsorship money, and first preset effect data, and
the first preset effect data is set on the basis of an event intensity value that is calculated on the basis of the amount of sponsorship money.

2. The sponsorship server of claim 1, wherein the sponsorship money data further includes sponsorship wording information, and
the operations further comprise:
converting the sponsorship wording information into voice data after the first preset time period and generating second event data by combining the voice data and the first preset effect data, and
transmitting the second event data with the second transmission window to the streaming server.

3. The sponsorship server of claim 2, wherein the first preset effect data includes at least one selected from a group of volume of the voice data and color, size, and highlighting effects of the text data corresponding to the sponsor ID and the text data corresponding to the amount of sponsorship money.

4. The sponsorship server of claim 1, wherein when the sponsorship money data is further received from the multiple sponsor terminals for the first preset time period,
the operations further comprise:
further receiving the sponsorship money data from the multiple sponsor terminals through the transceiver for a second preset time period from a point in time when the first preset time period ends,
determining, on the basis of the sponsorship money data, the sponsor terminal that has given the highest amount of sponsorship money among the multiple sponsor terminals, after the second preset time period
generating the event split window,
generating the second transmission window by overlaying the event split window on the first transmission window, and
transmitting the second transmission window to the streaming server through the transceiver,
wherein the event split window includes third event data that is generated by combining text data corresponding to the sponsor ID of the sponsor terminal that has given the highest amount of sponsorship money, text data corresponding to the highest amount of sponsorship money, and second preset effect data, and
the second preset effect data is set on the basis of both the event intensity value and an additional event intensity value calculated on the basis of the amount of sponsorship money further received.

5. The sponsorship server of claim 4, wherein the sponsorship money data further includes sponsorship wording information, and
the operations further comprise:
converting the sponsorship wording information into voice data after the second preset time period and generating fourth event data by combining the voice data and the second preset effect data, and
transmitting the fourth event data with the second transmission window to the streaming server.

6. A method performed by a sponsorship server, the method comprising:
receiving a first transmission window in real time to provide streaming content from a streamer terminal;
receiving sponsorship money data from multiple sponsor terminals, the sponsorship money data including a sponsor ID (identification) and an amount of sponsorship money set for each of the multiple sponsor terminals; and
determining whether during a first preset time period from a point in time when the sponsorship money data is received, the sponsorship money data is further received from the multiple sponsor terminals,
wherein when the sponsorship money data is not received from the multiple sponsor terminals for the first preset time period,
the method further comprises:
generating an event split window after the first preset time period;
generating a second transmission window by overlaying the event split window on the first transmission window; and
transmitting the second transmission window to a streaming server,
wherein the event split window includes first event data that is generated by combining text data corresponding to the sponsor ID, text data corresponding to the amount of sponsorship money, and first preset effect data, and
the first preset effect data is set on the basis of an event intensity value that is calculated on the basis of the amount of sponsorship money.

7. The method of claim 6, wherein the sponsorship money data further includes sponsorship wording information, and
the method further comprises:
converting the sponsorship wording information into voice data after the first preset time period and generating second event data by combining the voice data and the first preset effect data; and
transmitting the second event data with the second transmission window to the streaming server.

8. The method of claim 7, wherein the first preset effect data includes at least one selected from a group of volume of the voice data and color, size, and highlighting effects of the text data corresponding to the sponsor ID and the text data corresponding to the amount of sponsorship money.

9. The method of claim 6, further comprising:
when the sponsorship money data is further received from the multiple sponsor terminals for the first preset time period, further receiving the sponsorship money data from the multiple sponsor terminals for a second preset time period from a point in time when the first preset time period ends;
determining, on the basis of the sponsorship money data, the sponsor terminal that has given the highest amount of sponsorship money among the multiple sponsor terminals, after the second preset time period;
generating the event split window;
generating the second transmission window by overlying the event split window on the first transmission window; and
transmitting the second transmission window to the streaming server, wherein the event split window includes third event data that is generated by combining text data corresponding to the sponsor ID of the sponsor terminal that has given the highest amount of sponsorship money, text data corresponding to the highest amount of sponsorship money, and second preset effect data, and the second preset effect data is set on the basis of both the event intensity value and an additional event intensity value calculated on the basis of the amount of sponsorship money further received.

* * * * *